United States Patent [19]

Fournie

[11] 3,792,922
[45] Feb. 19, 1974

[54] LAP DISSOLVE SLIDE PROJECTOR

[76] Inventor: Thomas A. Fournie, 6805 Zumirez Dr., Malibu, Calif. 90265

[22] Filed: May 14, 1973

[21] Appl. No.: 359,856

[52] U.S. Cl. ................................. 353/83, 353/20
[51] Int. Cl. ........................................ G03b 23/16
[58] Field of Search .............. 353/20, 21, 81, 83, 86

[56] References Cited
UNITED STATES PATENTS
3,215,036  11/1965  Kirkcommell ........................ 353/20
3,514,198  5/1970  Schacht .............................. 353/98

*Primary Examiner*—Louis R. Prince
*Assistant Examiner*—A. J. Mirabito

[57] ABSTRACT

A lap dissolve slide projector arranged to receive and hold a slide at each of two projecting stations has polarizing means including a polarizing beam splitter and is operable to selectively project the slide loaded in either one of the projecting stations while previewing the slide loaded in the other. The projector utilizes the polarizing means to control which slide image is being projected and previewed and to effect the lap dissolve transition from the image of one slide to another.

13 Claims, 1 Drawing Figure

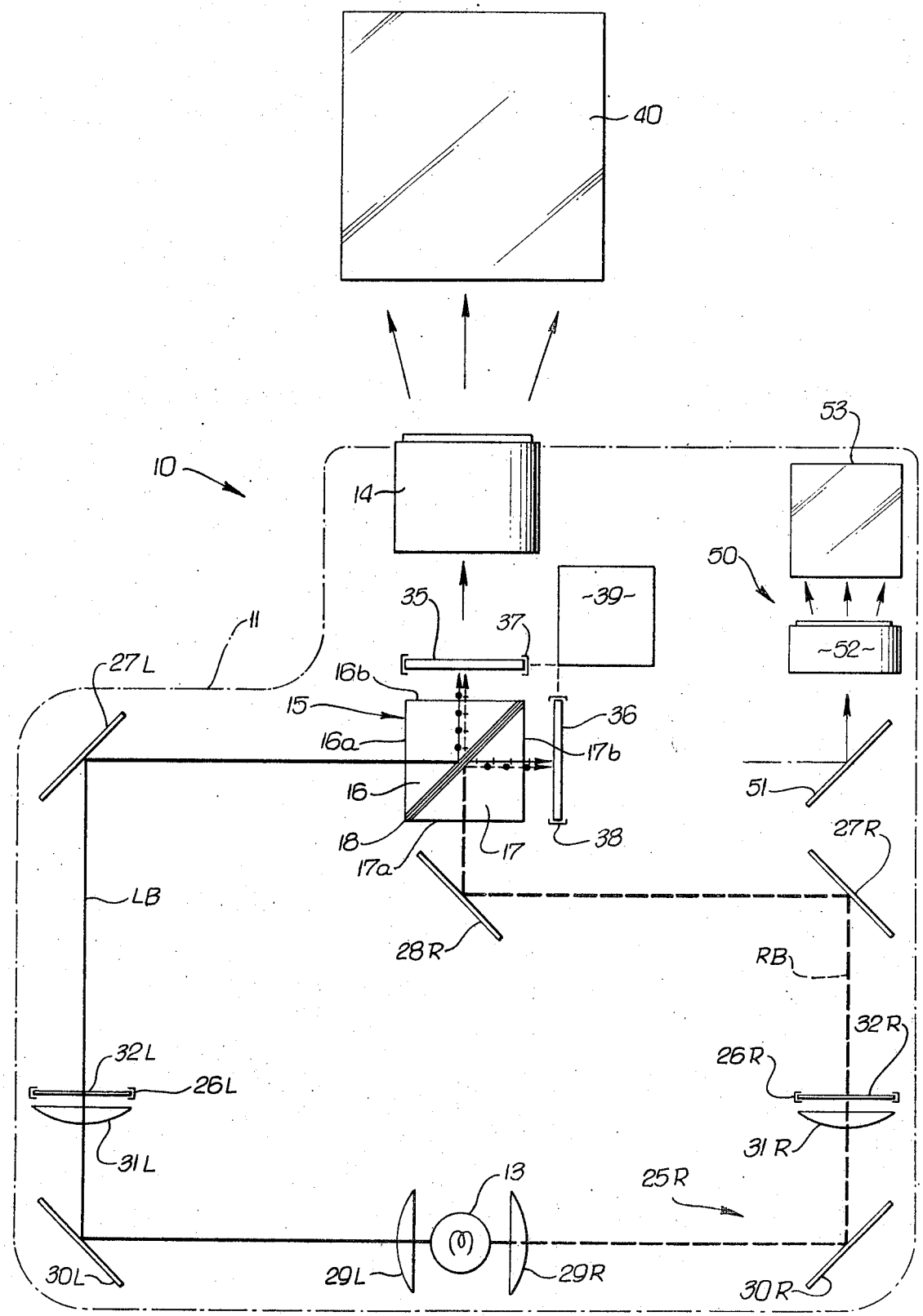

LAP DISSOLVE SLIDE PROJECTOR

BACKGROUND OF THE INVENTION

The present invention relates to lap dissolve slide projectors.

As used herein the term lap dissolve refers to the gradual fading out of the entire image of one slide projected on a viewing area while simultaneously developing in substantial spatial correspondence the image of another slide on the same viewing area.

SUMMARY OF THE INVENTION

It is an object of the present invention to provide a lap dissolve slide projector which is an improvement on the slide projector disclosed in my U.S. patent application Ser. No. 51,155 filed 30 June 1970 now U.S. Pat. No. 3,738,741.

It is further an object of the present invention to provide a lap dissolve slide projector capable of previewing a slide before projecting it on a viewing screen.

In accomplishing these and other objects, there is provided a lap dissolve slide projector arranged to receive and hold a slide at each of two projecting stations. The projector utilizes a polarizing beam splitter and is operable to selectively project the slide loaded in either one of the projecting stations while previewing the slide loaded in the other projecting station.

BRIEF DESCRIPTION OF THE DRAWING

The single FIGURE drawing is a plan view of a lap dissolve slide projector according to the present invention.

DETAILED DESCRIPTION OF THE PREFERRED EMBODIMENT

Referring to the drawing in more detail, there is shown a slide projector generally indicated by the numeral 10 having a housing 11 shown in broken lines. Mounted centrally at the rear and front, respectively, of the housing 11, are a lamp 13 and a projection or objective lens 14. The optical axis of the lens 14 is illustrated aligned with the center axis of the projector 10.

Mounted symmetrically across the center axis of the projector 10 behind the projection lens 14 is a polarizing beam splitter 15. The beam splitter 15 is preferably in the shape of a cube and is a compound prism constructed of two similar prisms 16 and 17 with a multilayer interference film 18 of uniform thickness cemented between their base surfaces. The prisms 16 and 17 illustrated have the shape of isosceles triangles in cross-section and define, respectively, entrance faces 16a, 17a and exit faces 16b, 17b. The prism faces 16a, 17b and 16b, 17a are positioned, respectively, parallel and perpendicular to the center axis of the projector 10. The multilayer material 18 extends at an angle of 45° to the projector center axis. Thereby, the entrance and exit surfaces 16a, 17a, 16b, 17b are all positioned at 45° to the multilayer thin film 18.

The indices of refraction of the prisms 17, 16 and of the layers of the multilayer material 18 are preselected to define a Brewster or polarizing angle at the interface of the prisms 16, 17 and multilayer material 18 of approximately 45° for the visible light spectrum. Thereby, the beam splitter 15 is operable to divide an input light beam directed into its entrance faces 16a or 17a along entrance paths at right angles to the planes of the faces 16a, 17a into two equal intensity output beams at right angles to one another which are plane polarized 90° apart. The output beams are transmitted and reflected out the exit faces 16b, 17b along exit paths perpendicular to the planes of the faces 16b, 17b. The $p$ polarization of an input beam (indicated by crosses) is transmitted by the multilayer film 18 while the $s$ polarization of an input beam (indicated by dots) is reflected thereby. The $p$ polarization of the input beam is the light vibrating parallel to the plane of incident of the input beam, i.e. the plane of the sheet of drawing, while the $s$ polarization is the light vibrating perpendicular to this plane of incidence.

Detailed descriptions of this type of polarizing beam splitter are found in U.S. Pat. No. 2,403,731 issued to S. M. MacNeille and in an article by A. F. Turner and P. W. Baumeister appearing in Applied Optics, vol. 5, No. 1, Jan. 1966, pp. 69–76.

Positioned on the right and left handed sides of the projector 10 are light directing systems for receiving light from the light source 13, forming the light into a light beam, illuminating a slide, and directing the light illuminating the slide into one of the entrance faces of the beam splitter 15 along an entrance path perpendicular thereto. It is noted that the optical paths of the right and left hand light directing systems are equal in length and a suffix L or R is used to identify optical components in the respective light directing systems.

The right light directing system includes a condensing lens system 25R; an arrangement 26R defining a first projecting station for receiving and holding a slide or the like; and plane mirrors 27R, 28R. The condensing lens system 25R is made up of a lens 29R, plane mirror 30R, and lens 31R and operates to form an unpolarized right converging visible light beam RB which illuminates the slide 32R loaded in the projecting station defined by the slide holding structure 26R. The light beam RB is illustrated by a dashed line and is directed by the mirrors 27R, 28R to the beam splitter entrance face 17a.

The left light directing system is constructed similar to the aforedescribed right light directing system except that the left unpolarized converging visible light beam LB which it forms to illuminate the slide 32L loaded in the slide holding structure 26L is directed by only one plane mirror 27L to the entrance face 16a of the beam splitter 15. The light beam LB is illustrated by a solid line.

Mounted across the light output paths of the beam splitter exit faces 16b, 17b, respectively, are plane polarizer elements 35, 36. The polarizer elements 35, 36 are rotatably mounted in guides 37, 38, respectively, and are interconnected by control means 39, as indicated by broken lines, with their polarization orientations in alignment. The control means 39 may be any suitable mechanical, mechanical-electrical or other arrangement and is selectively operable to rotate both the polarizers 35, 36 together simultaneously in a coordinate action so that the polarizers 35, 36 are maintained in alignment.

The projections lens 14 receives and projects on a viewing area, illustrated as viewing screen 40, the portion of the beam splitter output from exit face 16b which is transmitted by the polarizer 35. Positioned to receive the portion of the beam splitter output from exit face 17b which is transmitted by the polarizer 36 is a slide preview arrangement 50. The preview arrangement 50 is illustrated as being made up of a plane mirror 51, a preview lens 52 and a preview screen 53.

In operation, the slide projector 10 is operable to project the image of the slide 32R on the viewing screen 40 when the plane polarizer 35 is orientated to transmit p polarized light (indicated by crosses). A focussed image of the slide 32L is projected on the screen 40 by the projection lens 14.

With the polarizer 35 orientated to transmit p polarized light, the polarizer 36 is also orientated to transmit p polarized light. Thus, the image of the slide 32L loaded in the projecting station defined by structure 26L is being projected on the preview screen 53. The preview lens 52 operates to form a focussed image of the slide 32L on the preview screen 53. Consequently, the slide 32L may be previewed prior to its projection on the viewing screen 40.

By selectively operating the control means 39 to rotate the orientation of the plane polarizers 35, 36 90° so that they transmit s polarized light (indicated by dots), a lap dissolve transition is made on the viewing screen 40 from the image of the slide 32R loaded in the projecting station 26R to the image of the slide loaded in the projecting station 26L. It is noted that a lap dissolve transition is also simultaneously made on the preview screen from the image of the slide 32L to the image of the slide 32R. It is noted that since the optical paths of the right and left hand light directing systems are equal that once the projection lens 14 is adjusted to project a focussed image of a slide in one of the projecting stations 26R, 26L on the viewing screen 40 it is also adjusted to project a focussed image of the slide in the other projecting station.

The slide 32R in the projecting station 26R which has already been projected may now be unloaded therefrom and replaced with the next slide to be projected. Once loaded in the projecting station 26R, the image of this next slide to be projected is previewed on the screen 53 since the polarizers 35, 36 are still orientated to transmit s polarized light. By now selectively operating the control means 39 to again rotate the orientation of the plane polarizers 90°, a lap dissolve transition may be made on the viewing screen 40 from the image of the slide 32L loaded in the projecting station 26L to the image of the slide just loaded in the projecting station 26R.

By operating the slide projector 10 in the manner above described, slides may be previewed prior to projection on a viewing screen. Further, the viewing screen 40 need never be blank since the slides may be changed in the projecting station being viewed on the preview screen. Further, since a lap dissolve transition is made from the projection of the image of one slide to another, undesirable changes in light intensity on the viewing screen, such as when the screen goes blank, are eliminated.

It is noted in the operation of the projector 10 that the prism 16 and multilayer material 18 function as one means to s polarize the portion of the light beam LB directed to the polarizer 35 while the prism 17, multilayer material 18 and prism 16 operate as another means to p polarize the portion of the light beam RB directed along the same light exit path to the polarizer 35. The polarizer 35 functions as the means for controlling which of the beams LB, RB is transmitted to the projecting lens 14.

The preview system of the projector 10 operates on the same principles above described with regard to the projector's projection system.

It is noted that the term slide projector is used herein to encompass all types of equivalent light projecting apparatus.

I claim:

1. A lap dissolve slide projector, comprising:
   means defining first and second projecting stations each for receiving and supporting a slide or the like to be projected;
   means for forming a first unpolarized visible illuminating light beam and a second unpolarized visible illuminating light beam, said light beam forming means being positioned to illuminate a slide supported at said first projecting station with said first illuminating beam and to illuminate a slide supported at said second projecting station with said second illuminating beam;
   polarizing beam splitter means having first and second light entrance paths and a first light exit path, said beam splitter means being operable to generate from an unpolarized visible input light beam received along said first entrance path a first plane polarized output light beam directed along said first exit path, said beam splitter means being operable to generate from an unpolarized visible input light beam received along said second entrance path a second plane polarized output light beam directed along said first exit path which is polarized 90° apart from said first output beam;
   light directing means positioned with respect to said projecting stations and beam splitter means for directing said first illuminating beam as an input along said first entrance path and said second illuminating beam as an input along said second entrance path;
   projection lens means for projecting slide images on a selected viewing area, said projection lens means being positioned to receive and project output beams from said beam splitter first exit path; and
   first plane polarizing means positioned to intercept output beams from said beam splitter first exit path, the polarization orientation of said first plane polarizing means being selectively changeable between one position aligned with the polarization of said first output beam and another position 90° out of alignment therewith whereby a lap dissolve transition may be made on a selected viewing area from the projection of the image of a slide supported at one of said projecting stations to the image of a slide supported at the other of said projecting stations by rotating said first polarizing means between said one and other positions.

2. The invention defined in claim 1, wherein said polarizing beam splitter is a compound prism made up of two prisms having flat base surfaces with a multilayer material of substantially uniform thickness interposed between said base surfaces, the indices of refraction of said prisms and the layers of said multilayer material having preselected valves to define a selected Brewster's angle at the interfaces of said prisms and multilayer material.

3. The invention defined in claim 2, wherein:
   the indices of refraction of said prisms and of the layers of said multilayer material are preselected to define a Brewster's angle of 45°; and said first exit path is substantially perpendicular to said first entrance path and in alignment with said second entrance path, each of said entrance and exit paths intersecting the plane defined by said multilayer material at approximately a 45° angle.

4. The invention defined in claim 1, wherein:
said beam splitter means also has a second light exit path, said beam splitter means being operable to divide an unpolarized visible input light beam received along said first entrance path into said first plane polarized output light beam directed along said first exit path and a third plane polarized output light beam directed along said second exit path which is polarized 90° apart from said first output beam, said beam splitter means further being operable to divide an unpolarized visible input light beam received along said second entrance path into said second plane polarized output light beam directed along said first exit path and a fourth plane polarized output light beam directed along said second exit path which is plane polarized 90° apart from said second output beam and hence polarized 90° apart from said third output beam; and including:
means for previewing the image of slide to be projected, said preview means being positioned to receive output beams from said beam splitter second exit path and being operable to form the image of a slide supported in said first or second projecting station; and
second plane polarizing means positioned between said beam splitter preview means to intercept output beams from said beam splitter second exit path, the polarization orientation of said second plane polarizing means being selectively changeable between one position aligned with the polarization of said fourth output beam and another position 90° out of alignment therewith whereby the previewing of the image of a slide supported at one or the other of said projecting stations may be selectively controlled by the orientation of said second plane polarizing means.

5. The invention defined in claim 4, including control means for maintaining the orientations of said first and second polarizing means in phase and coordinately rotating said polarizing means together selectively between their one and other positions so that when the image of a slide in one of said projecting stations is being projected the image of a slide in the other of said projecting stations is being previewed.

6. The invention defined in claim 5, wherein said polarizing beam splitter is a compound prism made up of two prisms having flat base surfaces with a multilayer material of substantially uniform thickness interposed between said base surfaces, the indices of refraction of said prisms and the layers of said multilayer material having preselected valves to define a selected Brewster's angle at the interfaces of said prisms and multilayer material.

7. The invention defined in claim 6, wherein:
the indices of refraction of said prisms and of the layers of said multilayer material are preselected to define a Brewster's angle of 45°; and
said entrance paths are substantially perpendicular to each other and preview said exit paths are substantially perpendicular to each other, said second exit path being aligned with said first entrance path and said first exit path being aligned with said second entrance path, each of said entrance and exit paths intersecting the plane defined by said multilayer material at approximately a 45° angle.

8. In a lap dissolve slide projector wherein slides in first and second projecting stations are, respectively, illuminated by first and second light beams, said first and second light beams being each divided into a first beam portion which is projected from said slide projector by a projection lens and a second beam portion which is not projected from said slide projector, the first portions of said first and second light beams being plane polarized 90° apart and said slide projector having a first plane polarizing means for controlling the plane of polarization of light projected from said projection lens so that a slide supported in one or the other of said projecting stations may be selectively projected on a viewing screen by selectively changing the polarization orientation of said first polarizing means, the improvement in combination therewith comprising:
means for plane polarizing the second portions of said first and second light beams 90° apart;
means positioned to receive the second portions of said first and second light beams for previewing the images of slides supported at said first and second projecting stations; and
second plane polarizing means positioned to control the plane of polarization of light received by said preview means, the polarization orientation of said second plane polarizing means being selectively changeable between one position whereat a slide supported in said first projecting station is previewed to another position whereat a slide supported in said second projecting station is previewed.

9. The invention defined in claim 8, including means for simultaneously changing the polarization orientations of said first and second polarizing means, said second polarizing means being orientated with respect to said first polarizing means to transmit to said preview means the second portion of the one of said light beams not being projected so that the slide in the one of said projecting stations which is not being projected is previewed.

10. A slide projector, comprising:
means defining first and second projecting stations each for receiving and supporting a slide or the like to be projected;
means for forming a first unpolarized visible illuminating light beam and a second unpolarized visible illuminating light beam, said light beam forming means being positioned to illuminate a slide supported at said first projecting station with said first illuminating beam and to illuminate a slide supported at said second projecting station with said second illuminating beam;
polarizing beam splitter means having first and second light entrance paths and first and second light exit paths, said beam splitter means being operable.

11. The invention defined in claim 10, including:
means for previewing the image of a slide to be projected, said preview means being positioned to receive output beams from said beam splitter second exit path and being operable to form the image of a slide supported in said first or second projecting station; and wherein:

said means for plane polarizing light also intercepts the component of said first light beam made up of light polarized 90° apart from said predetermined orientation and the component of said second light beam made up of light polarized at said determined orientation whereby change of the polarization orientation of said plane polarizing means between alignment with said determined orientation and 90° out of alignment therewith causes the image of the one of the slides in said projecting stations not being projected to be previewed.

12. The invention defined in claim 11, wherein said polarizing beam splitter means is a compound prism made up of two prisms having flat base surfaces with a multilayer material of substantially uniform thickness interposed between said base surfaces and defines a selected Brewster's angle for the visible light spectrum at the interfaces of said prisms and multilayer material.

13. The invention defined in claim 12 wherein:

said polarizing beam splitter means defines a Brewster's angle of approximately 45° for the visible light spectrum; and to direct visible light received along said first input path polarized in a determined plane of orientation out said first exit path and polarized in a plane 90° apart from said determined orientation out of said second exit path, said beam splitter means further being operable to direct visible light received along said second input path plane polarized 90° apart from said determined orientation out said first exit path and plane polarized in said determined orientation out said second exit path;

light directing means positioned with respect to said projecting stations and beam splitter means for directing said first illuminating beam as an input along said first entrance path and said second illuminating beam as an input along said second entrance path;

projection lens means for projecting slide images on a selected viewing area, said projection lens means being positioned to receive and project output beams from said beam splitter first exit path; and means for plane polarizing light positioned to intercept the component of said first light beam made up of light polarized at said determined orientation and the component of said second light beam made up of light polarized 90° apart from said determined orientation, the polarization orientation of said plane polarizing means being changeable between alignment with said determined plane of polarization orientation and 90° out of alignment therewith whereby transition may be made on a selected viewing area from the projection of the image of a slide supported at one of said projecting stations to the image of a slide supported at the other by so changing the polarization orientation of said plane polarizing means each of said entrance and exit paths intersect the plane defined by said multilayer material at approximately a 45° angle.

* * * * *

UNITED STATES PATENT OFFICE
CERTIFICATE OF CORRECTION

Patent No. 3,792,922     Dated 19 February 1974

Inventor(s) THOMAS A. FOURNIE

It is certified that error appears in the above-identified patent and that said Letters Patent are hereby corrected as shown below:

In column 5, line 32 should read --said beam splitter and preview means to intercept out- --;
and line 65 should read --each other and said exit paths are substan- --.

Claim 10, printed at column 6, lines 45-59, should read:
--10. A slide projector, comprising:
means defining first and second projecting stations each for receiving and supporting a slide or the like to be projected;
means for forming a first unpolarized visible illuminating light beam and a second unpolarized visible illuminating light beam, said light beam forming means being positioned to illuminate a slide supported at said first projecting station with said first illuminating beam and to illuminate a slide supported at said second projecting station with said second illuminating beam;
polarizing beam splitter means having first and second light entrance paths and first and second light exit paths, said beam splitter means being operable to direct visible light received along said first input path polarized in a determined plane of orientation out said first exit path and polarized in a plane 90° apart from said determined orientation out said second exit path, said beam splitter means further being operable to direct visible light received along said second input path plane polarized 90° apart from said determined orientation out said first exit path and plane polarized in said determined orientation out said second exit path;

UNITED STATES PATENT OFFICE
CERTIFICATE OF CORRECTION

Patent No. 3,792,922   Dated 19 February 1974

Inventor(s) THOMAS A. FOURNIE

~~It is certified that error appears in the above identified patent and that said Letters Patent are hereby corrected as shown below:~~ light directing means positioned with respect to said projecting stations and beam splitter means for directing said first illuminating beam as an input along said first entrance path and said second illuminating beam as an input along said second entrance path;

projection lens means for projecting slide images on a selected viewing area, said projection lens means being positioned to receive and project output beams from said beam splitter first exit path; and means for plane polarizing light positioned to intercept the component of said first light beam made up of light polarized at said determined orientation and the component of said second light beam made up of light polarized 90° apart from said determined orientation, the polarization orientation of said plane polarizing means being changeable between alignment with said determined plane of polarization orientation and 90° out of alignment therewith whereby transition may be made on a selected viewing area from the projection of the image of a slide supported at one of said projecting stations to the image of a slide supported at the other by so changing the polarization orientation of said plane polarizing means.

In column 7, at line 3 "predetermined" should read —determined—.

page 2 of 3

UNITED STATES PATENT OFFICE
CERTIFICATE OF CORRECTION

Patent No. 3,792,922          Dated 19 February 1974

Inventor(s) THOMAS A. FOURNIE

It is certified that error appears in the above-identified patent and that said Letters Patent are hereby corrected as shown below:

Claim 13, printed at column 7 line 19 – column 8 line 30, should read:

—13. The invention defined in claim 12 wherein:
said polarizing beam splitter means defines a Brewster's angle of approximately 45° for the visible light spectrum; and
each of said entrance and exit paths intersect the plane defined by said multilayer material at approximately a 45° angle.—

Signed and sealed this 5th day of November 1974.

(SEAL)
Attest:

McCOY M. GIBSON JR.
Attesting Officer

C. MARSHALL DANN
Commissioner of Patents